United States Patent
Das

(10) Patent No.: US 9,336,445 B2
(45) Date of Patent: May 10, 2016

(54) METHOD AND A SYSTEM FOR OCCUPANCY LOCATION

(71) Applicant: OSRAM GmbH, Munich (DE)

(72) Inventor: Saptarshi Das, Bangalore (IN)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/284,414

(22) Filed: May 22, 2014

(65) Prior Publication Data

US 2014/0348386 A1  Nov. 27, 2014

(30) Foreign Application Priority Data

May 22, 2013 (IN) .......................... 2242/CHE/2013

(51) Int. Cl.
*G06K 9/00* (2006.01)
*G06K 9/62* (2006.01)
*G06K 9/36* (2006.01)

(52) U.S. Cl.
CPC ........ *G06K 9/00771* (2013.01); *G06K 9/00496* (2013.01); *G06K 9/00832* (2013.01); *G06K 9/6226* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 2006/0291695 A1* | 12/2006 | Lipton | G06K 9/00771 382/103 |
| 2007/0127774 A1* | 6/2007 | Zhang | G06K 9/00771 382/103 |
| 2009/0016481 A1* | 1/2009 | Slinger | 378/2 |
| 2011/0211110 A1* | 9/2011 | Doublet | 348/370 |
| 2012/0189164 A1* | 7/2012 | Feris et al. | 382/103 |
| 2013/0011051 A1* | 1/2013 | Bottisti et al. | 382/159 |
| 2013/0011063 A1* | 1/2013 | Kwon et al. | 382/173 |
| 2013/0156261 A1* | 6/2013 | Jiang et al. | 382/103 |
| 2013/0182905 A1* | 7/2013 | Myers | H04N 7/18 382/103 |

OTHER PUBLICATIONS

Chen et al., "A Coded Aperture Compressive Imaging Array and Its Visual Detection and Tracking Algorithms for Surveillance Systems", Sensors 2012, 12, Oct. 29, 2012, pp. 14397-14415.*
Ramirez et al., "Hyperspectral Pixel Classification From Coded-Aperture Compressive Imaging", Proc. of SPIE vol. 8401, Independent Component Analyses, Compressive Sampling, Wavelets, Neural Net, Biosystems, and Nanoengineering X, 84010J, May 1, 2012.*
R.F. Marcia and R.M. Willett. Compressive coded aperture super-resolution image reconstruction. In Acoustics, Speech and Signal Processing, 2008. ICASSP 2008. IEEE International Conference on, pp. 833-836, IEEE, 2008.

(Continued)

*Primary Examiner* — Matthew Bella
*Assistant Examiner* — Jose M Torres
(74) *Attorney, Agent, or Firm* — Viering, Jentschura & Partner mbB

(57) ABSTRACT

A method for occupancy location includes capturing a spatially coded image of a scene, identifying a region of interest in the image, generating a pixel plausibility index for each image pixel in the region of interest, and classifying pixels as relating to occupancy responsive to the pixel plausibility index.

15 Claims, 3 Drawing Sheets

(56) References Cited

OTHER PUBLICATIONS

R. Marcia, Z. Harmany, and R. Willett. Compressive coded aperture imaging. In Proc. SPIE Symp. Elec. Imaging: Computer Imaging, San Jose, CA, 2009.

N. Jacobs, S. Schuh, and R. Pless. Compressive sensing and differential image-motion estimation. In Acoustics, Speech and Signal Processing (ICASSP), 2010. IEEE International Conference on, pp. 718-836, IEEE, 2010.

* cited by examiner

METHOD AND A SYSTEM FOR OCCUPANCY LOCATION

CROSS-REFERENCE TO RELATED APPLICATION

This application claims priority to Indian Patent Application Serial No. 2242/CHE/2013, which was filed May 22, 2013, and is incorporated herein by reference in its entirety.

TECHNICAL FIELD

Various embodiments relate to a method and a system for occupancy location, preferably in an efficient manner. In particular, the present invention relates to occupancy location in a defined area.

BACKGROUND

Energy conservation is one of the foremost requirements of today's electronic era. Humanity had moved to automation and mostly depends on various kinds of automated electronic/mechanical system to perform their daily tasks. One of the kinds of such automated systems are systems for controlling electronics devices, lighting sources, other energy consuming devices etc. in a room (or a defined area). Such systems are configured to control the lighting sources and/or other energy consuming devices based on the occupancy of the room (or the defined area). In general, said systems comprises of sensors to detect occupancy of the room and based on occupancy activates/de-activates the electronic devices without any manual intervention and thereby preventing the wastage of energy.

Occupancy detection systems essentially consist of sensors and a controller connected via a network with the sensors in order to control lighting sources and other energy consuming devices based on the occupancy of a room (or a defined area). The sensors detect whether the room (or the defined area) is empty or occupied and pass on the information to the controller which eventually controls the illumination of lighting devices and power of other energy consuming devices.

In such systems, the efficiency reduces with the increased area, say for example big rooms, conference rooms, office space, meeting halls etc., as only a small portion of the room is occupied most of the time. In such situations, the optimal energy saving strategy should be to slowly dim (or switch off) the lights (or other energy consuming devices) in the unoccupied area. However, such disclosed systems are not able to perform desired functions due to lack of optimized functioning of the system in relation to occupancy location of the defined area.

In order to overcome the aforesaid shortcomings of typical occupancy detection systems, occupancy location systems had been developed over the time. In such systems, sensor measurements of conventional high resolution video camera and high computational resources were used to determine occupancy location. Hence, said systems were not cost effective and require maintenance.

Further, conventional occupancy location systems are upgraded by using coded aperture cameras instead of classical lens based cameras. The coded aperture cameras are much cheaper, have larger field of view and maintenance free. Coded aperture camera with reduced number of photo sensors, also known as compressive coded aperture camera is much cheaper and has several desirable properties. However, the measurements from the said coded aperture camera require much complex processing as compared to the lens based cameras.

In general, the coded aperture camera is similar to a pin hole camera, however the aperture of the compressive coded aperture camera is made of multiple pin holes. Thus the coded aperture camera has better signal-to-noise ratio to a classical pin hole camera.

Although the coded aperture camera have advantages over the conventional lens based camera and the pin hole camera, the photo sensor measurements obtained using the coded aperture camera require extensive post processing in order to reconstruct the image. Since compressive coded aperture camera use less number of sensors then the number of pixels in the image, the required post processing is even more extensive.

There are several inventions related to coded aperture camera. However, there are no practical prior methods available for occupancy location using a compressive coded aperture camera. Further, said methods are not suitable for real time implementation using micro-controllers. Few of them are discussed herein below:

In ref. [1] (R. F. Marcia and R. M. Willett. *Compressive coded aperture superresolution image reconstruction. In Acoustics, Speech and Signal Processing,* 2008. *ICASSP* 2008. *IEEE International Conference* on, pages 833-836, IEEE, 2008) special aperture is designed for compressive coded aperture camera, and known algorithm for compressive sensing is used to reconstruct the scene image. However, the method presented in ref. [1] require special aperture design, and the computational complexity is too high for an implementation in a micro-controller.

In ref. [2] (R. Marcia, Z. Harmony, and R. Willett. *Compressive coded aperture imaging. In Proc. SPIE Symp. Elec. Imaging: Computer Imaging,* San Jose, Calif., 2009) special optical setup is done using a compressive coded aperture camera in order to obtain super resolution images. However, the method described in ref. [2] requires special optical setup, and the computational complexity is too high for an implementation in a micro-controller.

In ref. [3] (N. Jacobs, S. Schuh, and R. Pless. *Compressive sensing and differential image-motion estimation. In Acoustics, Speech and Signal Processing (ICASSP),* 2010. *IEEE International Conference* on, pages 718-836, IEEE, 2010) a method is described to process the sensor measurements of compressive coded aperture camera to detect movement or occupancy. However, the method described in ref. [3] requires accurate motion model. The requirement for an accurate motion model makes the method of ref. [3] impractical.

To overcome the above identified limitations of the existing arts there is need for a solution that provides a practical and cost effective occupancy location system, which employs a very fast and memory efficient processing of data, which can utilize the sensor measurements from a compressive coded aperture camera preferably using a 20-50 MHz micro-controller.

SUMMARY

Various embodiments provide a solution to the above-mentioned shortcomings of existing arts by providing a novel method and a system for occupancy location.

Various embodiments further provide a fast and memory efficient method and system for occupancy location.

Various embodiments provide a method and a system which does not recover an image from the measurements of a compressive coded aperture camera rather only identifies the locations that are occupied, thereby reducing the complexity of the system.

Various embodiments may include a method for occupancy location including the steps of capturing a spatially coded image of a scene and identifying a region of interest in the image. Thereafter, generating a pixel plausibility index for each image pixel in the region of interest and classifying pixels as relating to occupancy responsive to the pixel plausibility index.

According to various embodiments, the step of capturing the spatially coded image includes computing sensor measurements of a compressive coded aperture camera for a current frame of the image and background sensor measurements of the image.

Preferably, the region of interest in the image comprises of all $M_x \times N_x$ pixels of the image, if all the pixels of the image are to be tested, where $M_x \times N_x$ being the dimension of the image. Otherwise a subset of all $M_x \times N_x$ pixels of the image, if only the pixels in a particular region of the image are required to be tested.

According to various embodiments, the step of identifying the region of interest in the image includes a step of generating a list of pixels of interest in the image.

Preferably, the step of generating the list of pixels of interest in the image further includes generating list while considering that an occupant cannot move more than one pixel between two successive frames of the image.

According to various embodiments, the step of generating the list of pixels of interest in the image further includes generating list while considering second neighbour pixels of the already occupied pixels in the image.

Preferably, the list of pixels of interest in the image includes pixels at the border of the region of interest, pixels that were occupied in a last frame and pixels that are at the boundary of the currently occupied pixels.

According to various embodiments, the step of generating pixel plausibility index includes computing pixel plausibility index in accordance with a linear relation $$y = \Phi x + \eta$$

wherein y being the MyNy×1 vectorized sensor measurement, where My×Ny is an array of photo sensors, $\Phi$ being an optical transfer matrix which relate the scene with the sensor measurement, which is an MyNy×MxNx matrix, x being MxNx×1 vectorized form of the scene and $\eta$ being the noise term accounting for the measurement error and model error.

According to various embodiments, the step of classifying pixels as relating to occupancy responsive to the pixel plausibility index includes, preferably, classifying the pixels on the basis of a fixed cut-off threshold of the pixel plausibility index, wherein pixels with plausibility index above the said fixed cut-off threshold are classified as occupied and pixels with plausibility index below the said fixed cut-off threshold are classified as unoccupied.

Various embodiments also provide a system for occupancy location. The system includes means for capturing a spatially coded image of a scene, means for identifying a region of interest in the image, means for generating a pixel plausibility index for each image pixel in the region of interest and means for classifying pixels as relating to occupancy responsive to the pixel plausibility index.

According to various embodiments, the system is configured for compressive coded aperture camera, which is a low cost, low maintenance camera. Further, it is configured in such a way that it can perform with a 20 MHz micro-controller.

Preferably, means for capturing the spatially coded image comprises of a compressive coded aperture camera.

Further, the means for capturing the spatially coded image configured to compute sensor measurements of a compressive coded aperture camera for a current frame of the image and background sensor measurements of the image.

According to various embodiments, means for identifying the region of interest in the image configured to generate a list of pixels of interest in the image. The list of pixels of interest in the image is generated while considering that an occupant cannot move more than one pixel between two successive frames of the image.

According to various embodiments, the list of pixels of interest in the image is generated while considering second neighbour pixels of the already occupied pixels in the image.

According to various embodiments, the means for generating the pixel plausibility index is configured to compute pixel plausibility index in accordance with a linear relation $$y = \Phi x + \eta$$

wherein y being the MyNy×1 vectorized sensor measurement, where My×Ny is an array of photo sensors, $\Phi$ being an optical transfer matrix which relate the scene with the sensor measurement, which is an MyNy×MxNx matrix, x being MxNx×1 vectorized form of the scene and $\eta$ being the noise term accounting for the measurement error and model error.

Preferably, the means for classifying pixels as relating to occupancy responsive to the pixel plausibility index is configured to classifying the pixels on the basis of a fixed cut-off threshold of the pixel plausibility index, wherein pixels with plausibility index above the said fixed cut-off threshold are classified as occupied and pixels with plausibility index below the said fixed cut-off threshold are classified as unoccupied.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
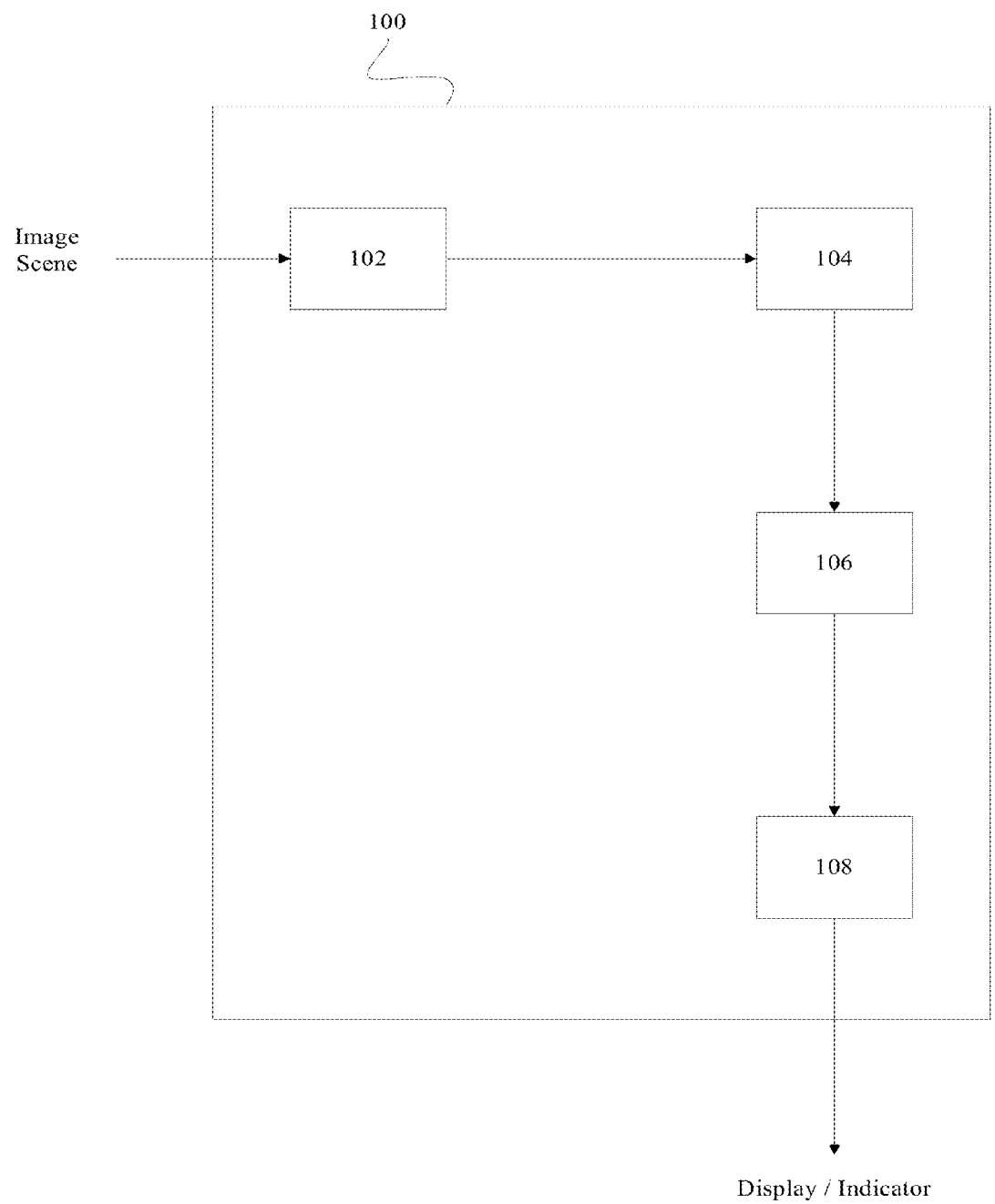
FIG. 1 is a block diagram illustrating the system for occupancy location in accordance with the one of the preferred embodiments of the present disclosure.

The present invention is described hereinafter by various embodiments with reference to the accompanying drawings, wherein reference numerals used in the accompanying drawings correspond to the like elements throughout the description. In order to achieve full description and explanation, specific details have been mentioned to provide a thorough and comprehensive understanding of various embodiments of the present invention. However, said embodiments may be utilized without such specific details and in various other ways broadly covered herein. Known features and devices have been shown in the form of block diagrams so as to prevent redundancy and for the sake of brevity. Further, the block diagrams have been incorporated to facilitate description of one or more embodiments.

FIG. 1 is a block diagram illustrating the system for occupancy location in accordance with the one of the preferred embodiments of the present invention. The disclosed system (100) comprises of a means for capturing (102) a spatially coded image of a scene, a means for identifying (104) a region of interest in the image, a means for generating (106) a pixel plausibility index for each image pixel in the region of interest and a means for classifying (108) pixels as relating to occupancy responsive to the pixel plausibility index.

According to one of the preferred embodiments of the present invention, the means for capturing (102) a spatially coded image of the scene comprises of, but not limited to, a compressive coded aperture camera. The means for capturing (102) further comprises of microprocessor which is connected to the compressive coded aperture camera. The microprocessor computes the sensor measurements of the compressive coded aperture camera for a current frame of the image and background sensor measurements of the image.

Preferably, the compressive coded aperture camera is equipped with an My×Ny array of photo sensors and y being the MyNy×1 vectorized sensor measurement. Further, Mx×Nx is dimensions of the underlying scene and x being MxNx×1 vectorized form of the scene. The optical transfer matrix that relates the scene with the sensor measurements is denoted by $\Phi$, which is an MyNy×MxNx matrix. Thus the sensor measurements and the scene are related by the following relation:

$$y = \Phi x \quad (1)$$

In the context of compressive coded aperture camera, MyNy<MxNx.

According to yet another preferred embodiment of the present invention, the means for identifying (104) the region of interest in the image comprises of a microcontroller which is configured to generate a list of pixels of interest in the image.

Preferably, the microcontroller considers that an occupant cannot move more than one pixel between two successive frames of the image. However, if the said assumption is violated then it considers the second neighbour pixels of the already occupied pixels to generate the list of pixels of interest in the image. Further, the microcontroller considers, but not limited to, three types of pixels while generating the list of pixels of interest in the image, such as pixels at the border of the region of interest, pixels that were occupied in a last frame and pixels that are at the boundary of the currently occupied pixels.

According to yet another preferred embodiment of the present invention, the means for generating (106) the pixel plausibility index for each image pixel in the region of interest comprises of a processor configured to calculate the pixel plausibility index while considering the background corrected measurements of the compressive coded aperture camera sensors and the optical transfer matrix ($\Phi$). The detailed information in respect of computing pixel plausibility index will be elaborated under the detail description of FIG. 2 later.

According to one of the preferred embodiments of the present invention, the means for classifying (108) pixels as relating to occupancy responsive to the pixel plausibility index comprises of a classifier (say a band-pass filter) which classifies the pixels as occupied or unoccupied based on a fixed cut-off threshold. It is to be noted that here the band-pass filter has been mentioned merely for sake of example, any type of filter or processor may be used as classifier to provide desired results along with the application of any other method of classification of pixels.

According to yet another preferred embodiment of the present invention, the system (100) comprises of a display or indicator which is configured to display or indicate the results of the functioning of the aforesaid components of the system (100).

Figure 2:
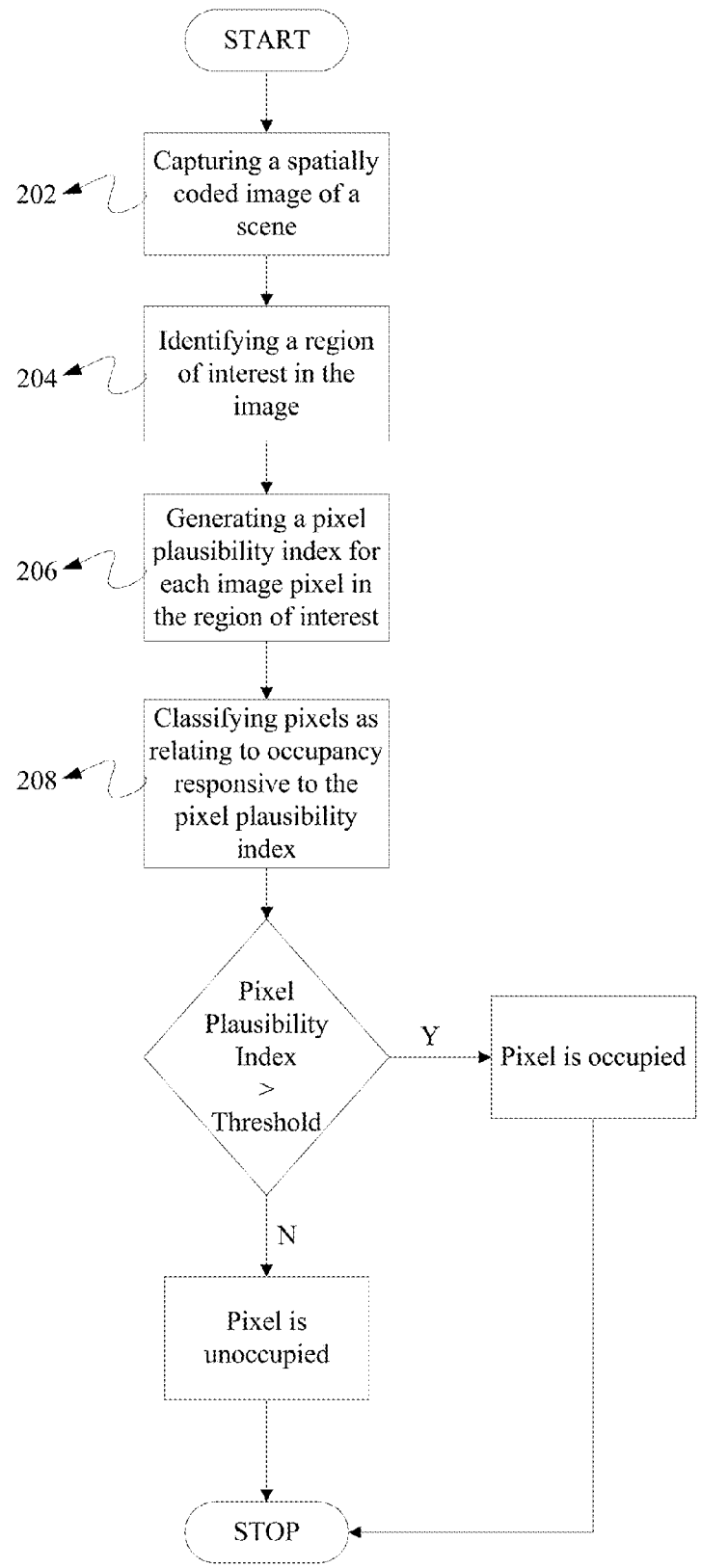
FIG. 2 is a flow chart illustrating the method for occupancy location in accordance with the one of the preferred embodiments of the present disclosure.

FIG. 2 is a flow chart illustrating the method for occupancy location in accordance with the one of the preferred embodiments of the present invention. The disclosed method does not reconstruct the whole image of the scene rather it identifies the locations where the image of the scene is significantly different from the background, and locates occupants. In the disclosed preferred embodiment as shown in FIG. 2, the process of occupancy location is carried out by using sensor measurements of the compressive coded aperture camera as follows:

In step 202, a spatially coded image of a scene is captured. This step includes initialization of variables, list etc. For example, at the very beginning, the list of objects should be set to empty. One of the binary variable allPixels, which keeps the information regarding whether all the scene pixels should be considered for object detection or not. The variable allPixels should be set to NO at the very beginning. Any other variables that need proper initialization should be initialized at this step.

Further, the step 202 comprises of a step of computing sensor measurements of the compressive coded aperture camera for the current frame (Y) of the image along with the background sensor measurements (B) of the image. Thereafter, the current frame of the image is corrected from the background sensor image measurements of the image, say for example, but not limited to, by performing simple point wise subtraction (Y=Y−B).

In step 204, a region of interest in the image is identified. The said region of interest in the image depends on the decision of a person skilled in the art carrying out the disclosed process whether he desires to test all $M_x \times N_x$ pixels of the image or a subset of the all $M_x \times N_x$ pixels of the image. In other words, if the decision is YES to the decision question Are all pixels necessary then all $M_x \times N_x$ pixels should be tested and if the decision is NO then only the pixels (i.e. subset of all $M_x \times N_x$ pixels) in the region of interest in the image should be tested.

According to one of the preferred embodiments of the present invention, the step 204 includes generating the list of pixels of the interest in the image, wherein the list of pixels of interest is composed of, but not limited to, the following three types of pixels:

pixels at the border of the region of interest in the image;
pixels that were occupied in a last frame; and
pixels that are at the boundary of the currently occupied pixels.

Preferably, while considering pixels at the border of the region of interest in the image it is assumed that new occupants can enter only by crossing these pixels. Further, for considering pixels that were occupied in the last frame information from an object list is required. The object list comprises of, but not limited to, database of objects and consists of information regarding their positions and/or movement. Also, for pixels that are at the boundary of the currently occupied pixels it is assumed that these are the pixels that can get occupied by the movement of the occupants of the previous frame. These three types of pixels have been shown in FIG. 3 for sake of clarity and explanation.

Further, the step 204 includes generating the list of pixels of interest in the image while considering that an occupant cannot move more than one pixel between two successive frames of the image. The said consideration proves to be reasonable and hold in most of the practical cases, however, if in case said consideration is violated, then the second neighbour pixels of the already occupied pixels are to be considered for generating the list of pixels of interest in the image.

In step 206, a pixel plausibility index for each image pixel in the region of interest is generated. In other words, the plausibility of each pixel as part of an occupant is calculated. This is the most critical step of the disclosed process and the object of the claimed process is that it should be carried out with limited computational and memory resource.

According to one of the preferred embodiment of the present invention, the pixel plausibility index may be estimated by using the background corrected measurements of the compressive coded aperture camera sensors, and the optical transfer matrix. In addition to said parameters, noise measurements have also been considered in the final calculations. The equation 2 below is used:

$$y = \Phi x + \eta \qquad (2)$$

where $\eta$ is the noise term accounting for the measurement error, and model error.

The reduced system of equations between the observed sensor measurements and the pixels of interest is given by:

$$y = \Phi_I x_I + \eta \qquad (3)$$

where I denote the index of the list of pixels in the region of interest, $x_I$ denotes the image pixel values restricted to the index I and $\Phi_I$ denote the optical transfer matrix $\Phi$ restricted to the index I, i.e. $\Phi_I$ consists of the columns of $\Phi$ corresponding to the index set I.

Preferably, the plausibility index may be estimated by crudely solving the equation (3), and considering the absolute value of the solution as plausibility index. A framework for solving the equation (3) can be posed as follows:

$$\underset{x_I}{\operatorname{argmin}}\{\|y - \Phi_I x_I\|_p^p + \lambda_h \|D_I^h x_I\|_q^q + \lambda_v \|D_I^v x_I\|_q^q\} \qquad (4)$$

The penalty terms $$\lambda_h \|D_I^h x_I\|_q^q$$

and $$\lambda_v \|D_I^v x_I\|_q^q$$

related to the total variation of the scene are used because of the following two reasons: first, in case of compressive coded aperture camera, the matrix $\Phi_I$ can be underdetermined; second, smoothness is a practical a priori information for images, and total variation penalty enforce smoothness. The above optimization problem (4) can also be setup as a constraint optimization problem, and equation (4) will be the corresponding Lagrange form.

Different values for p and q can be used in (4). However, for a robust solution p=q=1 is used in (4). Considering p=q=1 in equation (4), the equation (4) can be rewrite as:

$$\underset{x_I}{\operatorname{argmin}} \left\| \begin{pmatrix} y \\ 0 \\ 0 \end{pmatrix} - \begin{pmatrix} \Phi_I \\ \lambda_h D_I^h \\ \lambda_v D_I^h \end{pmatrix} x_I \right\|_1 \qquad (5)$$

The problem in equation (5) is in the canonical form of least absolute deviation regressions, and it can be solved in several ways. An iterative reweighted least squares of (5) is used to solve it partially i.e. in order to obtain an intermediate result using only a few step as permitted by the computational resource. The reweighted least squares method is started by setting the weights equal to one for all the variables. After each of the iterations of the iterative reweighted least squares the weight is re-estimated as inverse of the residue. Within each iteration of iterative reweighted least square, the following least squares are required to be solve:

$$\underset{x_I}{\operatorname{argmin}} \left\| W^{\frac{1}{2}} \begin{pmatrix} y \\ 0 \\ 0 \end{pmatrix} - W^{\frac{1}{2}} \begin{pmatrix} \Phi_I \\ \lambda_h D_I^h \\ \lambda_v D_I^h \end{pmatrix} x_I \right\|_2^2 \qquad (6)$$

where W is the weight matrix. The problem (6) is a canonical least square problem. Because of the limitation in the computational limitations, rather than solving the subproblem, update the weight for the next iteration. The solution can be achieved by using conjugate gradient type of method, in particular couple of iteration of LSQR and LSMR algorithms. In order to get more close to the solution using only few steps, preconditioners like Jacobi preconditioners may be used.

In step 208, pixels as relating to occupancy responsive to the pixel plausibility index have been classified. In other words, the plausibility index of the pixels is used to classify pixels as occupied or unoccupied. There are various methods for classifying pixels based on the plausibility index. However, one of the preferred methods is by using a fixed cut-off, i.e. pixels with plausibility index above the specified cut-off threshold are classified as occupied and pixels with plausibility index below the threshold are classified as unoccupied. Further, better classification can be done using simple statistical techniques for each cluster of occupied pixels.

According to another preferred embodiment of the present invention, in addition to the steps 202 to 208 discussed above, the process of occupancy location may have, but not limited to, following steps (not shown):

The results of classification step 208 have been analyzed and if the results are not acceptable, say for example if an occupant suddenly disappears, or considerably shrink in size, then the results should not be accepted. In case the results are acceptable, and the occupancy is not above a pre-specified threshold, then the last object list should be updated and the variable allpixels should be set to NO. However, if the object list of the previous frame is empty, then a new object list need to be created from the scratch. Further, if the result is unacceptable, or the occupancy is above a prescribed threshold, then the last object list is discarded. After discarding the last object list, it is not possible to generate the pixels of interested using step 204. Thus the variable allpixels is set to YES, so that for the next frame all the pixels are considered for plausibility.

Figure 3:
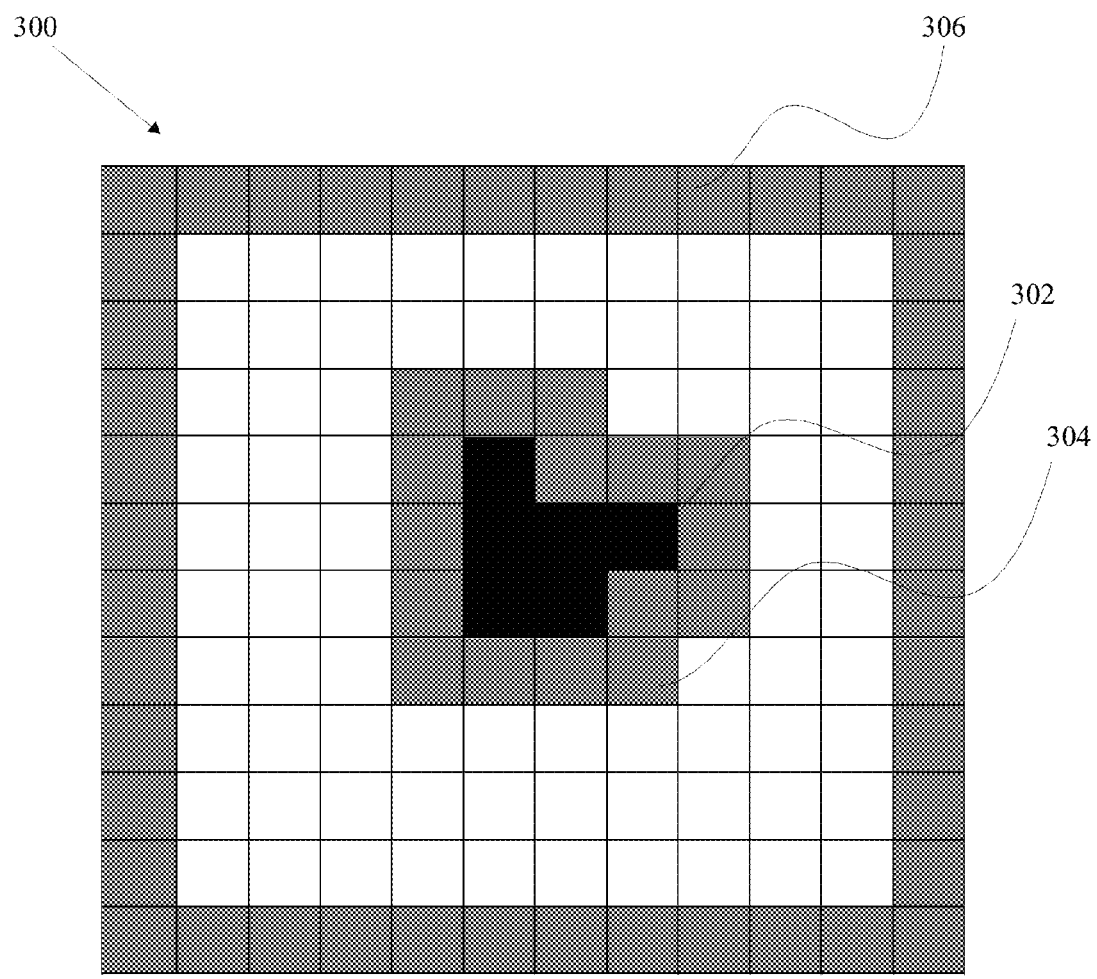
FIG. 3 is a schematic view of the scene to be considered while generating a list of pixels of interest in the image under study which comprises of three types of pixels in accordance with the one of the preferred embodiments of the present disclosure.

FIG. 3 is a schematic view of the scene (300) to be considered while generating a list of pixels of interest in the image under study comprises of three types of pixels in accordance with one of the preferred embodiments of the present invention. In FIG. 3, the region of interest consists of the black pixels (302) which denote the occupied pixels. The pixels (304) along the boundary of the currently occupied pixels and the pixels (306) are at the boundary of the room or area under study. While generating a list of pixels of the interest in the image at step 204 of FIG. 2, the list of pixels of interest are, preferable, composed of pixels in the region 302, 304 and 306 as shown in FIG. 3.

The above disclosed method and system for occupancy location has several applications, however for sake of brevity few of them, but not limited to, is as follows:

Typical occupancy (or motion) sensor estimate whether a room is empty or not. Instead, of trying to estimate the exact occupied locations of the room using sensor measurements of a compressive coded aperture camera, an estimate regarding the occupied locations of a room or a predefined area can help in illuminating the room appropriately. For example the above discussed method and system can help in suitably illuminating the locations of the room with occupants, and slowly dimming or switching off the light at vacant locations. Apart from illumination control, the result of the disclosed method and system can be useful in controlling other energy consuming devices, like air conditioners.

Apart from occupancy detection for energy saving, the disclosed method can also be used for surveillance purpose, like intrusion detection.

At present a compressive coded aperture camera is being developed where LEDs at near infrared or infrared wavelength is used to illuminate the scene. The disclosed method can be used together with the above mentioned compressive coded aperture camera. Further, the disclosed method and system is independent of the type of illumination technique, therefore other illumination technique can also be used in conjunction with the proposed method and system.

Various modifications to these embodiments are apparent to those skilled in the art from the description and drawings herein. The principles associated with the various embodiment defined herein may be applied to other embodiments. Therefore, the description is not intended to be limited to the embodiments shown along with the accompanying drawings but is to be provided broadest scope consistent with the principles and novel and invention features describe/disclosed or suggested herein. Any modifications, equivalent substitutions, improvements etc. within the spirit and principle of the present invention shall all be included in the scope of protection of the present invention.

What is claimed is:

1. A method for occupancy location comprising:
capturing a spatially coded image of a scene,
identifying a region of interest in the image,
generating a pixel plausibility index for each image pixel in the region of interest, and
classifying pixels as relating to occupancy responsive to the pixel plausibility index,
wherein said identifying the region of interest in the image comprises of generating a list of pixels of interest in the image,
wherein said generating the list of pixels of interest in the image further comprises generating said list while considering that an occupant cannot move more than one pixel between two successive frames of the image.

2. The method as claimed in claim 1, wherein said capturing the spatially coded image comprises computing sensor measurements of a compressive coded aperture camera for a current frame of the image and background sensor measurements of the image.

3. The method as claimed in claim 1, wherein the region of interest in the image comprises:
all $M_x \times N_x$ pixels of the image, if all the pixels of the image are to be tested; otherwise
a subset of the all $M_x \times N_x$ pixels of the image, if only the pixels in the subset region are required to be tested;
where $M_x \times N_x$ being the dimension of the image.

4. The method as claimed in claim 1, wherein said generating the list of pixels of interest in the image further comprises generating said list while considering second neighbour pixels of the already occupied pixels in the image.

5. The method as claimed in claim 1, wherein the list of pixels of interest in the image comprises of following types of pixels:
pixels at the border of the region of interest;
pixels that were occupied in a last frame; and
pixels that are at the boundary of the currently occupied pixels.

6. The method as claimed in claim 1, wherein said generating pixel plausibility index comprises of computing pixel plausibility index in accordance with a linear relation $$y = \Phi x + \eta$$

wherein y being the MyNy×1 vectorized sensor measurement, where My×Ny is an array of photo sensors, $\Phi$ being an optical transfer matrix which relate the scene with the sensor measurement, which is an MyNy× MxNx matrix, x being MxNx×1 vectorized form of the scene and $\eta$ being the noise term accounting for the measurement error and model error.

7. The method as claimed in claim 1, wherein said classifying pixels as relating to occupancy responsive to the pixel plausibility index comprises of classifying the pixels on the basis of a fixed cut-off threshold of the pixel plausibility index, wherein
pixels with plausibility index above the said fixed cut-off threshold are classified as occupied; and
pixels with plausibility index below the said fixed cut-off threshold are classified as unoccupied.

8. A system for occupancy location, the system comprising:
means for capturing a spatially coded image of a scene,
means for identifying a region of interest in the image,
means for generating a pixel plausibility index for each image pixel in the region of interest, and
means for classifying pixels as relating to occupancy responsive to the pixel plausibility index,
wherein the means for identifying the region of interest in the image configured to generate a list of pixels of interest in the image,
further comprising a list of pixels of interest in the image is generated while considering that an occupant cannot move more than one pixel between two successive frames of the image.

9. The system as claimed in claim 8, wherein the means for capturing the spatially coded image further comprises of a compressive coded aperture camera.

10. The system as claimed in claim 9, wherein the means for capturing the spatially coded image configured to compute sensor measurements of the compressive coded aperture camera for a current frame of the image and background sensor measurements of the image.

11. The system as claimed in claim 8, wherein the region of interest in the image comprises of:
   all $M_x \times N_x$ pixels of the image, if all the pixels of the scene are to be tested; otherwise
   a subset of the all $M_x \times N_x$ pixels of the image, if only the pixels in the subset region are required to be tested;
   where $M_x \times N_x$ being the dimension of the image.

12. The system as claimed in claim 8, further comprising a list of pixels of interest in the image is generated while considering second neighbour pixels of the already occupied pixels in the image.

13. The system as claimed in claim 8, wherein the list of pixels of interest in the image comprises of following types of pixels:
   pixels at the border of the region of interest;
   pixels that were occupied in a last frame; and
   pixels that are at the boundary of the currently occupied pixels.

14. The system as claimed in claim 8, wherein the means for generating the pixel plausibility index configured to compute pixel plausibility index in accordance with a linear relation $$y = \Phi x + \eta$$

wherein y being the $M_y N_y \times 1$ vectorized sensor measurement, where $M_y \times N_y$ is an array of photo sensors, $\Phi$ being the optical transfer matrix that relate the scene with the sensor measurement, which is an $M_y N_y \times M_x N_x$ matrix, x being $M_x N_x \times 1$ vectorized form of the scene and $\eta$ being the noise term accounting for the measurement error and model error.

15. The system as claimed in claim 8, wherein the means for classifying pixels as relating to occupancy responsive to the pixel plausibility index configured to classify the pixels on the basis of a fixed cut-off threshold of the pixel plausibility index, wherein
   pixels with plausibility index above said fixed cut-off threshold are classified as occupied; and
   pixels with plausibility index below said fixed cut-off threshold are classified as unoccupied.

* * * * *